Patented Mar. 15, 1938

2,110,971

UNITED STATES PATENT OFFICE 2,110,971

PURIFICATION PROCESS

Albert S. Carter, Wilmington, Del., assignor to E. I. du Pont de Nemours & Company, Wilmington, Del., a corporation of Delaware No Drawing. Application May 18, 1937, Serial No. 143,298

16 Claims. (Cl. 260—170)

This invention relates to the purification of vinylacetylene. More particularly it relates to the removal of carbonyl impurities from vinylacetylene with aqueous solutions of soluble bisulfites.

The formation of addition compounds between carbonyl compounds and bisulfites is old and well known (Bunte. Ann. 170, 311 (1873)), but the use of bisulfite for the purpose of removing aldehydes from synthetic rubber intermediates has been complicated by the fact that conjugated unsaturated compounds such as butadiene react with sulfur dioxide, liberated from sodium bisulfite, and render the scrubbing agent ineffective. Butadiene is scrubbed with water for the removal of aldehydes (Smirnov and Tyutina, Sintet Kauchkuk 1934 (4), 12), but this introduces considerable loss of the gas being purified through solubility in the wash, for in the case of water, the capacity is low and the water must be frequently changed. In view of these facts, it is an unexpected discovery to find that vinylacetylene, which is conjugated, but contains conjugate double and triple bonds, does not react with sulfur dioxide during bisulfite washing and therefore is satisfactorily washed with solutions of bisulfite in an acidity range where the sulfur dioxide partial pressure is high and where the aldehyde removal is very efficient. In this manner, the scrubbing solution may be recirculated for an extended period without renewal, and the loss of vinylacetylene dissolved in the solution is relatively small, compared with the loss resulting through the use of water.

Vinylacetylene is used in the manufacture of chloro-2-butadiene-1,3, herein referred to as chloroprene. One method for the conversion of vinylacetylene into chloroprene is the subject of U. S. Patent 1,950,434 issued to Carter, Downing and Hutton. It has been found that the presence of aldehydes in chloroprene unnecessarily complicates its purification, due to the formation of constant boiling mixtures with various constituents of the crude mixtures. It is, therefore, advantageous to purify vinylacetylene to a practically aldehyde free condition prior to its conversion to chloroprene. Moreover, the presence of aldehyde in chloroprene is undesirable in the manufacture therefrom of artificial rubber, known by the name Neoprene. It has been found that the aldehyde content of chloroprene intended for this use should be restricted to not more than 0.5% and preferably to not more than 0.3%. This gives a further reason for purifying vinylacetylene by the removal of aldehydes and similar carbonyl compounds since the purification can best be accomplished before the conversion of vinylacetylene to chloroprene.

This invention has as an object the purification of vinylacetylene to render it practically free of carbonyl impurities, especially acetaldehyde. This object is accomplished by scrubbing vinylacetylene with an aqueous solution of a water soluble bisulfite and thereby removing the said carbonyl impurities. This method of accomplishing the desired result is based upon the discovery that, unlike butadiene and other conjugated unsaturated compounds, vinylacetylene is inert to sulfur dioxide and bisulfite solution under the conditions of the scrubbing process.

Vinylacetylene may be scrubbed either in the gas or liquid phase. Inasmuch as the process of United States Patent 1,950,434, above referred to, reacts vinylacetylene in the gaseous phase, it is particularly advantageous to scrub vaporized vinylacetylene just before introduction into the chloroprene process.

A scrubber of simple design consists of a packed tower, up which the gaseous vinylacetylene is allowed to rise in a countercurrent stream to the down flow of aqueous bisulfite liquor. The aqueous solution may be collected at the bottom and elevated to the top of the tower for recirculation by means of a pump, while the scrubbed gas is vented off of the top of the scrubber tower.

In any type of apparatus, the degree of aldehyde removal will be dependent upon the concentration of the bisulfite solution, the size of the vinylacetylene bubbles (or drops) and the period of contact between vinylacetylene and bisulfite. These cannot be specified because many variations in the type of apparatus produce numerous variations in the necessary contact time and solution strength. They can be determined for the type of apparatus best suited for the installation by analyzing the vinylacetylene and increasing the contact until the desirable maximum has been reached.

For the purpose of illustration, the following example will show the manner of operation which we have found to be most satisfactory. It is to be understood, however, that this example is merely by way of illustration and not limitation and that the process may be varied in a number of ways without departing from the invention.

Example

Three steel columns were constructed, each with an internal diameter of twelve inches and a length of fifteen feet, packed with iron rings of much smaller diameter than the columns. Each column was erected above a tank with a capacity of 1500 gallons and provided with a pump capable of delivering liquid from the tank through a spray distributor at the top of the column. The liquid flowed by gravity through the packing and discharged from the column through a U-type trap back into the tank. A feed line was provided at the bottom of each column through which vinylacetylene was introduced, and a vent line from the top allowed the gaseous vinylacetylene to pass off through a spray separator. Entrained spray deposited in the separator and was returned to the column through a small trap. The tank of the second scrubber was charged with 1000 gallons of a bisulfite solution containing 1 part by weight of sodium bisulfite, ($NaHSO_3$), to 4 parts by weight of water. When completely dissolved, the pump was started and the liquid flow to the column adjusted to about 100 to 200 gallons per hour, the bisulfite liquor returning continuously from the column to the tank and pump. The tank of the first scrubber was charged with 1000 gallons of a similar bisulfite solution which has previously been used and was hence partially exhausted and the rate of flow was adjusted to the same range. The tank of the third scrubber was charged with an aqueous solution of sodium hydroxide containing about 14 to 20% sodium hydroxide by weight and the rate of flow adjusted to 200 gallons per hour. The vinylacetylene flow was established at about 300 pounds per hour and the gas was passed at this rate through the scrubbers, passing first through the scrubber containing the partially exhausted bisulfite solution and then through the scrubber containing the fresh bisulfite solution and lastly through the scrubber containing the caustic solution. The inlet and outlet gases were analyzed at frequent intervals to determine the efficiency of the scrubber train. It was found that when the inlet gas contained 4 to 5% acetaldehyde (or other carbonyl compounds analyzing as acetaldehyde by means of hydroxylamine) the effluent from the scrubber train contained less than 0.25%.

The rate of gas flow and liquid flow in the columns can vary widely from the figures given in the example. It is best to have a liquid flow substantially over 15 gallons per square foot of column cross section per hour, but not sufficient to cause flooding. In most cases, highest efficiency is obtained before a rate is reached of 300 gallons per square foot of column cross section per hour. The gas flow should not be too great for efficient contact with the liquid and probably less than that required to give a linear velocity of 5 feet per second.

Many variations are possible in the type of scrubber employed. For example, the column such as disclosed in the preceding example may be packed with coke, carborundum, ceramic rings or any other material which will afford a large area of surface contact between the vinylacetylene and the scrubbing solution and which is inert under the operating conditions. Instead of a scrubber in which the gaseous vinylacetylene is allowed to rise in the counter-current stream to the down flow of aqueous bisulfite liquor, flood types of scrubbers may be used in which gaseous vinylacetylene is forced in at the bottom of a column of aqueous bisulfite which may be agitated, if desired, or dispersion of gas may be accomplished by means of a distributor plate of the "filtrose" type which is a porous plate adapted to disperse the gas into tiny bubbles.

Another type of apparatus which may be used in the scrubbing process is that which by means of one or more pumps produces turbulent flow through a tube of small cross-section at such a velocity that the gas and liquid are thoroughly mixed by turbulence. The same principle may be used in which the aqueous liquid is circulated by the high velocity gas stream without the aid of pumps. In either case, after contact, the gas and liquid are separated and the aqueous liquid returned to the scrubber.

Analysis of the gas leaving the second column of the scrubber train described in the detailed example will show that sulfur dioxide is continuously removed from the bisulfite solution, resulting in the formation of normal sulfite according to the following equation:

$$2NaHSO_3 \rightarrow Na_2SO_3 + H_2O + SO_2$$

This reaction decreases as the scrubbing solution is consumed due to the decreasing partial pressure of the sulfur dioxide from the mixture. The presence of sulfur dioxide in vinylacetylene is often undesirable and the third column containing the caustic solution is used to remove this impurity from vinylacetylene. Any alkali hydroxide may be used in this scrubber. I prefer to use sodium hydroxide because of its cheapness commercially. In some processes, the presence of small amounts of sulfur dioxide in vinylacetylene is not objectionable and, in fact, may even be desirable. Under these circumstances, the third column of the scrubber train need not be used but the vinylacetylene effluent from the second column may be used directly without further purification.

Any water soluble bisulfite may be used in the scrubber solutions. The bisulfites of sodium and potassium are particularly effective and hence preferred. Sodium bisulfite is especially preferred because of low cost. Moreover, the concentration of bisulfite solution is not critical. Solutions of $NaHSO_3$ varying from saturated solutions to nearly zero concentration have been observed and found to remove aldehyde from vinylacetylene. For this reason, the number of scrubber columns may be varied. Thus with weak solutions, three or more bisulfite scrubbers may be used. On the other hand, by selecting a proper concentration of bisulfite solution and suitable rates of flow for the solution and for the acetylene gas, a single scrubber may be used with good results; in fact, it has been found that by exercising proper controls, it is possible, using vinylacetylene originally containing up to 5% of acetaldehyde, to reduce the aldehyde to as low as 0.25% by the use of a single scrubber.

In view of the above, there are two factors tending to consume bisulfite, (1) reaction with aldehyde, and (2) the loss of $SO_2$. The available bisulfite in the solution can be readily determined at any time by titration with caustic to neutrality as indicated by phenolphthalein, and it should be discarded when approximately 80% consumed, for after this time, the concentration of active ingredient is so low that the efficiency is not high, though its activity is still proportionately great and can be used with a slower gas flow rate. The bisulfite solution is completely spent and inactive if it becomes alkaline to phenolphthalein.

Since the loss of sulfur dioxide from the scrubber solution is a function of the partial pressure of SO₂, and hence the acidity of the solution, it has been found advantageous to use mixtures of water soluble normal and acid sulfite to depress the liberation of SO₂. Thus the SO₂ escaping from a 12% solution of NaHSO₃ is greater than that lost from a solution of the same strength containing in addition 3% of Na₂SO₃, though the life of such a scrubber prior to the point where it becomes alkaline and inactive is reduced. Since normal sulfite is generated during the use of the bisulfite solutions, it is frequently satisfactory to start with a plain sodium bisulfite solution and permit it to adjust itself by use.

If it is desired to scrub vinylacetylene in the liquid phase, any of the usual types of apparatus designed to contact a water insoluble liquid possessing a density less than 1.0, with an aqueous solution, may be used. For example, liquid vinylacetylene may be added to a low pressure autoclave containing a suitable volume of bisulfite solution and the mixture vigorously agitated until tests indicate that the aldehyde content of the nonaqueous liquid has been reduced to a satisfactory minimum. During this operation, the temperature may be at 0 to 5° C. and the scrubbing carried out at atmospheric pressure, or the temperature may be higher, e. g. 5°–30° C., whereupon the pressure must be equal to the vapor pressure of vinylacetylene. These temperatures are by way of illustration and not limitation. Other temperatures may be used with suitable pressure conditions. At the conclusion of the scrubbing, agitation is stopped and when the liquids have separated into two layers, they may be drawn off by gravity, and the bisulfite solution may be reused until exhausted.

If it is preferred to wash liquid vinylacetylene in a continuous manner, it may be introduced into the bottom of a column of aqueous bisulfite in a tower and allowed to rise and overflow from the top. If the contact is sufficient, as determined by the size of the rising droplets and the height of their rise, practically aldehyde free vinylacetylene may be continuously drawn off the top of the column. The bisulfite solution may be continuously replaced at a slow rate by removing from the bottom of the column and introducing at the top to maintain at a constant level. The column may be packed in the same manner as described above for gaseous vinylacetylene. This may also be assisted by vigorously agitating the solution to obtain good mixing at the point of introduction of the vinylacetylene, or by introducing the vinylacetylene through a porous plate of the type previously described.

A further method of obtaining intimate contact of the aqueous and nonaqueous liquids is by passing them simultaneously through a tube of sufficiently small diameter to produce turbulent flow, and after sufficient contact, passing them through a liquid separator, designed to allow vinylacetylene to rise and be drawn off while the aqueous bisulfite is drawn off from the bottom and pumped back into the tube with fresh vinylacetylene.

There are no well defined temperature limits for scrubbing vinylacetlyene insofar as the operativeness of the process is concerned. For practical reasons, the temperature must be kept within reasonable limits in the case of the liquid phase process in view of the fact that vinylacetylene is a gas at temperatures above 4–8° C. at 760 mm. High temperatures would necessitate excessively high pressures and would hence entail needless expense. In the gas scrubbing system, elevated temperatures are to be avoided because of increased partial pressure of sulfur dioxide from the bisulfite solution. The evolution of sulfur dioxide in the washing steps, and hence the difficulty of scrubbing it out of the washed vinylacetylene, is increased with increase in temperature. On the other hand, if the temperature is allowed to drop too low in the gas washing system, the vinylacetylene may liquefy. The preferred operating range for the gas phase is 20° to 35° C., although the process is operable on either side of this range.

The operativeness of the process is not dependent upon the use of any particular pressure, save that in the operation of the gas phase system, the pressure should not be so high as to cause liquefaction of vinylacetylene. The preferred range is atmospheric pressure to 1000 mm.

A process has been described for the removal of carbonyl impurities, especially acetaldehyde, from vinylacetylene. This process, which involves the removal of the said impurities by means of bisulfite solutions, especially sodium and potassium bisulfites with or without the addition of normal sulfite, may be carried out by any suitable apparatus which will produce intimate contact over a large surface area between the vinylacetylene and the aqueous bisulfite solution. This purification of vinylacetylene renders it a superior raw material in the manufacture of chloroprene and Neoprene. Where desired, sulphur dioxide introduced by the bisulfite treatment may be removed by subsequent scrubbing with caustic solutions.

The foregoing example and description is illustrative only and is not intended to limit the scope of the invention. Any embodiments of the invention or variations which do not depart from the spirit of the invention are intended to be embraced within the scope of the claims.

I claim:

1. The process of treating vinylacetylene containing carbonyl impurities which comprises bringing vinylacetylene into intimate contact with an aqueous solution of a water soluble bisulfite.

2. The process of purifying vinylacetylene containing carbonyl impurities which comprises bringing vinylacetylene into intimate contact with an aqueous solution of a water soluble bisulfite by intermingling the vinylacetylene and the aqueous solution to produce a large area of contact surface between the two.

3. The process of purifying vinylacetylene containing carbonyl impurities which comprises bringing vinylacetylene into intimate contact with an aqueous solution of a water soluble bisulfite and a water soluble normal sulfite by intermingling the vinylacetylene and the aqueous solution to produce a large area of contact surface between the two.

4. The process of purifying vinylacetylene containing carbonyl impurities which comprises scrubbing vinylacetylene with an aqueous solution of a water soluble bisulfite and a water soluble normal sulfite by intermingling the vinylacetylene and the aqueous solution to produce a large area of contact surface between the two, and then scrubbing the vinylacetylene in a similar manner with an aqueous caustic solution to remove the sulfur dioxide introduced therein by the bisulfite treatment.

5. In the purification of vinylacetylene containing carbonyl impurities, the step of intermingling liquid vinylacetylene with an aqueous solution of a water soluble bisulfite to produce a large area of contact surface between them.

6. In the purification of vinylacetylene containing carbonyl impurities, the step of intermingling liquid vinylacetylene with an aqueous solution of a water soluble bisulfite and a water soluble normal sulfite to produce a large area of contact surface between the two liquids.

7. The process of purifying vinylacetylene containing carbonyl impurities, which comprises scrubbing liquid vinylacetylene with an aqueous solution of a soluble bisulfite, selected from the group consisting of sodium and potassium bisulfite by intermingling the two liquids to produce a large area of contact surface between them, separating the liquids and then treating the vinylacetylene in a similar manner with an aqueous caustic solution to remove the sulfur dioxide introduced by the bisulfite treatment.

8. The process of purifying vinylacetylene containing carbonyl impurities, which comprises scrubbing liquid vinylacetylene with an aqueous solution of a water soluble bisulfite and a water soluble normal sulfite by intermingling the two liquids to produce a large area of contact surface between them, separating the liquids and then treating the vinylacetylene in a similar manner with aqueous caustic solution to remove the sulfur dioxide introduced by the bisulfite treatment.

9. The process of purifying vinylacetylene containing carbonyl impurities, which comprises bringing vinylacetylene in the gaseous phase, into intimate contact with an aqueous solution of a water soluble bisulfite by intermingling the two to produce a large area of contact surface between them.

10. The process of purifying vinylacetylene containing carbonyl impurities, which comprises bringing vinylacetylene in the gaseous phase into intimate contact with an aqueous solution of a soluble bisulfite, selected from the group consisting of sodium and potassium bisulfite, by counter-current intermingling of the two in such a manner as to produce a large area of contact surface between the two.

11. The process of purifying vinylacetylene containing carbonyl impurities, which comprises scrubbing vinylacetylene in the gaseous phase with an aqueous solution of a water soluble bisulfite and a water soluble normal sulfite by counter-current intermingling of the gas and the aqueous solution in such manner as to produce a large area of contact surface between the two.

12. The process of purifying vinylacetylene containing carbonyl impurities, which comprises scrubbing vinylacetylene in the gaseous phase with an aqueous solution of a soluble bisulfite, selected from the group consisting of sodium and potassium bisulfites, by intermingling the two to produce a large area of contact surface between them, separating the two and then scrubbing the vinylacetylene in a similar manner with an aqueous caustic solution to remove the sulfur dioxide introduced by the bisulfite treatment.

13. The process of purifying vinylacetylene containing carbonyl impurities, which comprises scrubbing vinylacetylene in the gaseous phase by bringing the gas into intimate contact with a partially exhausted aqueous solution of sodium bisulfite in such manner as to produce a large area of contact surface between the two and then similarly scrubbing the gas with a less exhausted aqueous solution of sodium bisulfite.

14. The process of purifying vinylacetylene containing carbonyl impurities, which comprises scrubbing vinylacetylene in the gaseous phase by bringing the gas into intimate contact with an aqueous solution of sodium bisulfite in such manner as to produce a large area of contact surface between the two, then scrubbing the gas with a less exhausted aqueous solution of sodium bisulfite and then scrubbing the gas with an aqueous caustic solution to remove the sulfur dioxide introduced by the bisulfite treatment from the purified vinylacetylene.

15. The process of purifying vinylacetylene containing carbonyl impurities, which comprises scrubbing vinylacetylene in the gaseous phase by bringing the gas into intimate contact with an aqueous solution of sodium bisulfite and sodium normal sulfite in such manner as to produce a large area of contact surface between the two and then bringing the gas into intimate contact with a less exhausted aqueous solution of sodium bisulfite and then scrubbing the gas with an aqueous caustic solution to remove the sulfur dioxide introduced by the bisulfite treatment from the purified vinylacetylene.

16. The process of purifying vinylacetylene containing carbonyl impurities, which comprises continuously circulating and recirculating an aqueous solution of sodium bisulfite through a first reaction zone, continuously circulating and recirculating a stronger aqueous solution of sodium bisulfite through a second reaction zone, continuously circulating and recirculating an aqueous solution of sodium hydroxide through a third reaction zone, and continuously passing a current of vinylacetylene successively through the three respective reaction zones in counter-current direction to the aqueous solutions, whereby carbonyl impurities are removed from the vinylacetylene in the first two zones and sulfur dioxide is removed in the third zone.

ALBERT S. CARTER.